United States Patent [19]

Bruins et al.

[11] 4,273,973
[45] Jun. 16, 1981

[54] AUTOMATIC ELECTRIC DOWNRIGGER SHUT-OFF SWITCH

[76] Inventors: Roger C. Bruins, 1503 Broadview, Jenison, Mich. 49428; Earl D. Hart, 2621 Thornapple River Dr., SE., Grand Rapids, Mich. 49508

[21] Appl. No.: 104,431

[22] Filed: Dec. 17, 1979

[51] Int. Cl.³ .................... H01H 15/14; B65H 17/52
[52] U.S. Cl. ................................ 200/47; 200/61.14; 242/106
[58] Field of Search .................. 200/47, 61.13, 61.14, 200/61.19; 242/49, 106, 84.1 A, 57; 43/21

[56] References Cited

U.S. PATENT DOCUMENTS

| | | | |
|---|---|---|---|
| 2,927,170 | 3/1960 | Brown | 200/61.14 |
| 2,927,975 | 3/1960 | Jamieson | 200/61.13 |
| 3,052,878 | 9/1962 | Berry | 200/61.14 |
| 3,719,331 | 3/1973 | Harsch | 242/106 |
| 3,910,524 | 10/1975 | Ireland | 242/106 |

FOREIGN PATENT DOCUMENTS 848842 9/1960 United Kingdom .................. 200/47

*Primary Examiner*—Willis Little
*Attorney, Agent, or Firm*—John A. Waters

[57] ABSTRACT

An automatic electric downrigger shut-off switch comprises a pair of spaced electrical contacts mounted as to be in continuous physical contact with the downrigger's metal cable, which forms an electrically conductive path between the contacts. The switch includes a relay device that allows the downrigger motor to be operated through its main control switch so long as the cable provides electrical conductivity between the contacts. However, when a nonconductive sleeve mounted on the cable near the weighted end thereof comes into physical contact with one of the electrical contacts and disrupts the conductivity between them, the downrigger motor is automatically shut off to prevent the weight at the end of the cable from colliding with the end of the downrigger rod. An override switch is provided for reeling in the cable after the weight has been removed.

11 Claims, 3 Drawing Figures

AUTOMATIC ELECTRIC DOWNRIGGER SHUT-OFF SWITCH

BACKGROUND OF THE INVENTION

1. Field of the Invention

This invention relates to downrigger fishing apparatus and more particularly to an attachment for an electric motor-operated downrigger mechanism that automatically shuts off the downrigger reel motor when the cable is reeled in to a predetermined point.

2. Description of the Prior Art

A conventional electrically operated downrigger mechanism includes an electric motor-driven reel mounted at one end of a rod with a metal cable wound upon the reel and extending longitudinally along the rod and over a pulley mounted at the opposite end of the rod. When the cable is reeled in, if the motor is not shut off before the weight at the end of the cable collides with the pulley at the end of the rod, the mechanism may be damaged and the cable may break, causing the weight to drop into the water.

One known device for automatically shutting off a downrigger motor requires the use of an expanded bead on the downrigger cable. This contacts and closes a microswitch located at the end of the downrigger rod. This device has the disadvantage of requiring that power wires be strung all the way to the end of the rod. The microswitch also is in a position where it can be damaged by the cable or weight.

Another prior device uses the metal downrigger cable as a ground wire for the motor so that the motor is de-energized when the cable is reeled out of a body of water.

One of the objects of the present invention is to provide an improved automatic electric downrigger cutoff switch.

SUMMARY OF THE INVENTION

In accordance with the present invention, shut-off apparatus for automatically shutting off an electric motor-operated downrigger having a power source electrically connected to the motor and an electrically conductive downrigger cable comprises a pair of separated electrical contacts positioned along the cable in continuous physical contact therewith, such that the cable forms a conductive path between the contacts; means for disconnecting the power source from the electric motor when the conductive path between the contacts is broken; and means for breaking the conductive path between the contacts when the cable reaches a predetermined position as it is reeled in by the motor.

The means for disconnecting the power source includes a switch electrically connected to the separated electrical contacts and to the power source so as to electrically disconnect the power source from the downrigger motor when the conductive path between the contact is broken, at least when the cable is being reeled up by the motor. The means for breaking the conductive path between the contacts comprises a section of electrically non-conducting material positioned on the cable at a predetermined location such that engagement of the material with one of the contacts breaks the conductive path and causes deactuation of the motor. Desirably, this occurs just before the weight contacts the end of the downrigger rod.

After the downrigger motor has been automatically deactuated, a manual override switch can be actuated to continue to reel the cable in, desirably after the weight has been removed.

The switch means of the present invention is a normally open relay switch with the energizing coil of the switch being connected to the power source through the spaced electrical contacts. When the contracts are broken the coil becomes de-energized and the relay switch opens. The relay switch is connected in series with the circuit leading from the power source to the electrical motor when the main control switch of the downrigger assembly is in its "up" position. The override switch provides an alternative conductive path between the contacts when the conductive path between the contacts is broken.

Desirably the nonconductive material on the cable is a section of thermal shrinking plastic material commonly known as shrink tubing. A section of shrink tubing is placed over the cable and heated and shrinks tightly on the cable. Alternative types of nonconductive materials could be employed, such as an epoxy coating.

The shut-off switch mechanism is incorporated in a housing that can be mounted on the rod of a downrigger at a position adjacent the reel, with the electrical circuitry extending only the short distance from the switch apparatus to the base of the downrigger. It is not necessary to have any cables or contacts extending all the way out to the end of the downrigger rod. The housing can be clamped on the rod by a simple two-piece clamp that fits over the rod and attaches to the rod by means of threaded fasteners.

The wire contacts desirably are flexible sections of wire that extend outwardly from the switch housing into contact with the cable. A loop on the end of each wire fits over the downrigger cable and thereby provides continuous contact with the cable. The housing can be provided with a vertical slot for each wire contact so that some vertical movement of the cable can be accommodated by a vertical bending of the wire contact. A wire contact provides a simple and flexible electrical interconnection between the switch and the cable and permits substantial variation in cable position while still maintaining substantially a continuous contact with the cable. For corrosion resistance purposes a stainless steel wire is preferred.

The automatic shut-off switch of the present invention is simple and inexpensive, yet it provides an effective means for automatically shutting off an electrical downrigger before the weighted end of the downrigger cable comes into jarring contact with the end of the downrigger rod, thereby avoiding damage to the weight, the cable, and the rod.

These and other advantages and features of the present invention hereinafter appear. For purposes of illustration, but not of limitation, a preferred embodiment of the present invention is described below and shown in the appended drawings.

DETAILED DESCRIPTION OF THE DRAWINGS

Figure 1:
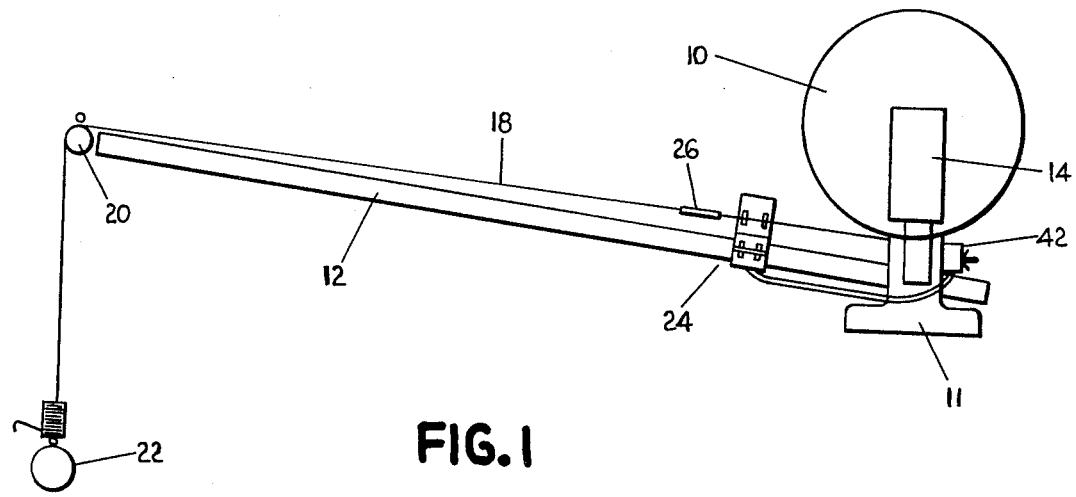
FIG. 1 is a partially schematic side elevational view of a downrigger assembly with the automatic shut-off switch of the present invention in place.

Referring now to the drawings, in FIG. 1 a downrigger reel 10 is rotatably mounted on a base 11, with a downrigger rod 12 extending outwardly from the base. The reel is rotatably driven by a motor 14, which is controlled by a main control switch 42. An electrically conductive cable 18 is wound on reel 10 and extends longitudinally along rod 12 and over a pulley 20 at the end of the rod. A weight 22 is suspended from the free end of cable 18.

The automatic shut-off switch 24 of the present invention is shown in FIG. 1 attached to rod 12. The electrically nonconductive material 26 (which may be either a length of shrink tubing or a coating of nonconductive material, such as epoxy-based paint) is mounted at a suitable location on cable 18 so that when the cable is reeled in, motor 14 is disconnected from its power source (not shown) before weight 22 collides with pulley 20.

Figure 2:
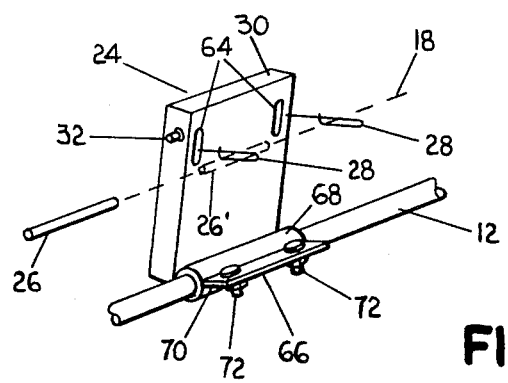
FIG. 2 is a detail showing the automatic shut-off switch attached to the downrigger rod.

In FIG. 2 the automatic shut-off switch 24 of the present invention is shown in greater detail. Electrical contacts 28 protrude from housing 30 and loop over cable 18 for substantially continuous contact therewith, such that cable 18 forms an electrically conductive path between the contacts 28. When cable 18 is reeled in to the point that the nonconductive material 26 moves to a position 26' such that it physically contacts one of the electrical contacts 28, the electrically conductive path between the contacts is broken. The automatic shut-off switch 24 then shuts off motor 14, and cable 18 is reeled in no further. If the user wishes to reel in more of cable 18, perhaps after removing weight 22, a manual override switch 32 may be actuated so that reel 10 may be rotated by way of main control switch 42.

Figure 3:
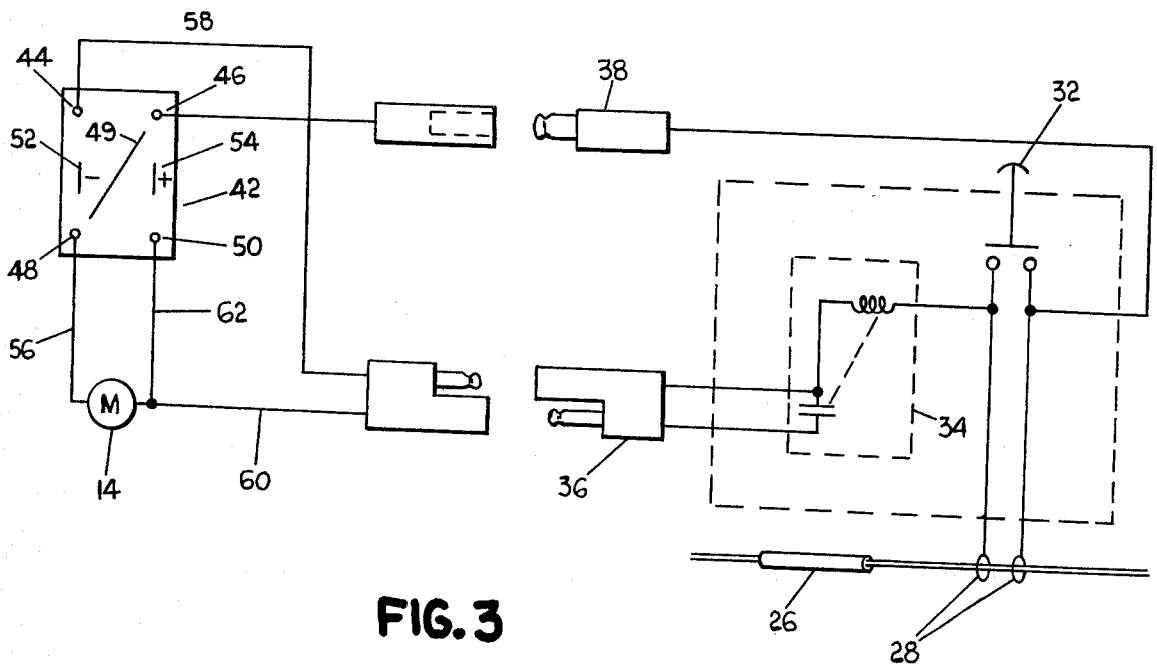
FIG. 3 is a schematic wiring diagram of the automatic shut-off switch showing the electric interconnection with the downrigger's main control switch.

The automatic shut-off switch 24 is schematically shown in further detail in FIG. 3. One of the electrical contacts 28 is connected to a relay switch 34 which is wired to electrical connector 36. The other electrical contact 28 is wired to electrical connector 38. Electrical connectors 36 and 38 allow the automatic shut-off switch 24 to be quickly and conveniently "plugged in" to the downrigger's control switch 42 and associated power source.

Control switch 42 is a two pole, three position switch having a pair of "up" contacts 44 and 46, a pair of "down" contacts 48 and 50, and two power source contacts 52 and 54. Contacts 46 and 48 are connected together by lead 49 but the remaining contacts are isolated.

When the switch is moved to its "up" position, the power source contacts 52 and 54 are connected to contacts 44 and 46, respectively, thus connecting the power source across those contacts. With contact 46 being connected to motor 14 by lead 49, contact 48, and lead 56 and contact 44 being connected to the opposite side of motor 14 by lead 58, relay 34 and return lead 60, the motor is actuated to raise the downrigger weight.

When the switch is moved to its "down" position, contact 48 is connected to motor 14 by lead 56 and contact 50 is connected to motor 14 by lead 62. However, the polarity of the power source is reversed in this position, thus causing the motor to rotate in the opposite direction to lower the weight downward.

So long as cable 18 remains in physical contact with electrical contacts 28, relay 34 remains closed and main control switch 42 may be used to control motor 14. However, when the nonconductive material 26 comes into physical contact with one of the electrical contacts 28 such that the electrical path between them formed by cable 18 is broken, relay 34 opens. When relay 34 opens, the circuit between main control switch 42 and motor 14 is broken and motor 14 stops.

When override switch 32 is closed, however, it completes the circuit between electrical contacts 28 and causes relay 34 to close, which in turn completes the circuit between main control switch 42 and motor 14.

The construction of shut-off switch 24 and the manner in which it is mounted on the downrigger mechanism are shown in FIG. 2. Housing 30 is formed of nonconductive material, with contacts 28 protruding from spaced vertical slots 64, the vertical slots permitting some vertical movement of the contacts as the vertical position of the cable varies. Contacts 28 are formed of resilient wire with looped ends that encircle the downrigger cable. Other means for providing spaced contacts in continuous contact with the downrigger cable could be employed, but the wire loop contacts of the present invention provide a simple and inexpensive means for accomplishing the desired spaced, continuous contacts on the cable over a significant range of cable positions.

The housing of the shut-off switch is attached at the bottom thereof to a clamp mechanism 66. This includes relatively movable upper and lower plates 68 and 70, respectively, defining a rod encircling sleeve, threaded fasteners 72 clamping the plates together on the rod to hold the housing in a substantially vertical plane adjacent the side of the rod. The electrodes 28 extend horizontally from the housing to contact the downrigger cable.

The foregoing represents merely an exemplary embodiment of the present invention. Various changes may be made in the arrangements and details of construction of the embodiments shown without departing from the spirit and scope of the present invention.

The embodiments of the invention in which an exclusive property or privilege are claimed are defined as follows:

1. Apparatus for automatically shutting off a downrigger having an electric motor-operated reel, a power source electrically connected to the motor, and an electrically conductive downrigger cable extending outwardly from the reel, the apparatus comprising:
   a pair of separated electrical contacts;
   means for mounting the electrical contacts in a predetermined position on the downrigger, such that the contacts are in continuous physical contact with the cable as it extends from the reel, the cable forming a conductive path between the contacts;
   means connected to the electrical contacts and the electrical connections for the electric motor for disconnecting the power source from the electric motor when said conductive path between the contacts is broken; and
   means mounted on the cable for breaking the conductive path between the contacts when the cable reaches the predetermined position as it is reeled in by the motor.

2. Apparatus according to claim 1 wherein:
   the means for disconnecting the power source from the electric motor comprises switch means electrically connected to the separated electrical contacts and to the power source for electrically disconnecting the power source from the downrigger motor when the conductive path between the contacts is broken, at least when the cable is being reeled up by the motor; and the means for breaking the conductive path between the contacts comprises a section of electrically nonconductive material on the cable at a predetermined location such that engagement of the nonconductive material with one of the contacts as the cable is reeled in breaking the conductive path between the contacts and causes deactuation of the motor.

3. Apparatus according to claim 2, wherein the downrigger includes a control switch having an up position, wherein the power source causes the motor to reel the cable in, and a down position, wherein the power source causes the motor to reel the cable out, and the switch means comprises a relay switch connected to the control switch circuit to override the circuit for the up position, the relay switch changing state to deactuate the power source from the motor when the control switch is in the up position and the conductive path connecting the electrical contacts is broken.

4. Apparatus according to claim 1 and further comprising a manually operable override switch means for overriding the means for disconnecting the power source from the electric motor and permitting the power source to continue to reel in the cable even when the conductive path between the electrical contacts is broken.

5. Apparatus according to claim 2, wherein the switch means for electrically disconnecting the power source from the downrigger motor comprises a relay switch that remains closed when the electrical contacts are electrically connected through the cable and that opens when the nonconductive material comes into contact with one of the electrical contacts.

6. Apparatus according to claim 2, wherein the switch means is mounted in the mounting means for the electrical contacts and the electrical contacts comprise spaced wire elements extending outwardly from the mounting means so as to contact the wire at different longitudinal positions thereon, the wire elements having loops formed therein that fit over the cable to provide substantially continuous contact therewith.

7. Apparatus according to claim 6, wherein the downrigger includes a rod extending outwardly from a reel, with the cable extending from the reel outwardly over a pulley at the end of the rod and then downwardly to the water, the mounting means for the electrical contacts and switch means being a housing adapted to be clamped by a clamping mechanism to the rod between the reel and the pulley, the clamping mechanism being adjustable and releasable for adjusting and removing the switch means from the downrigger, the clamping mechanism positioning the switch means adjacent the cable with the electrical contacts extending from the housing so as to be in spaced contact with the cable.

8. Apparatus according to claim 2, wherein the section of nonconductive material comprises a length of nonconductive shrink tubing positioned over the cable and shrunken tightly on the cable.

9. Apparatus according to claim 2, wherein the section of nonconductive material comprises a coating of epoxy-based material on the cable.

10. An automatic shut-off switch kit for a downrigger that includes an electrically driven reel, a rod extending outwardly from the reel to a pulley on the outer end, a conductive cable extending from the reel along the rod and over the pulley, an electrical control switch having up and down positions, and a power source connected to the control switch, the shut-off switch kit including:
a housing;
clamp means attached to the housing for releasably and adjustably mounting the housing on the rod at a position adjacent the cable;
a relay switch mounted in the housing and having open and closed positions;
a pair of spaced electrical contacts connected to the relay switch such that the relay switch, when connected to a power source, is in one state when the contacts are closed and the opposite state when the contacts are opened, the contacts protruding out of the housing and being adapted to be in continuous conduct with the cable when the housing is mounted properly on the rod, the cable forming a conductive path between the contacts;
electrical circuit means for interconnecting the relay switch with the control switch and power source such that the power source is deactivated from driving the reel in an up direction whenever the conductive path between the contacts is broken; and
nonconducting coating material capable of being applied to a section of the cable, the nonconductive coating material breaking the conductive path between the contacts when it comes into contact with one or more of the contacts.

11. A kit according to claim 10 and further comprising a manually operable override switch connected to the relay switch for providing an alternative conductive path between the contacts when the cable fails to provide a conductive path between the contacts, the override switch permitting the cable to be reeled up by the power source after the power source has been disconnected by the nonconductive material on the cable.

* * * * *